United States Patent

[11] 3,557,360

[72] Inventor Charles A. Aldridge
Barrington, Ill.
[21] Appl. No. 733,511
[22] Filed May 31, 1968
[45] Patented Jan. 19, 1971
[73] Assignee Bell & Howell Company
Chicago, Ill.
a corporation of Illinois

[54] APPARATUS FOR ILLUMINATING THE TAPE REELS AND SPINDLE SPLINES OF TAPE CASSETTES
4 Claims, 6 Drawing Figs.

[52] U.S. Cl. 240/2, 274/4
[51] Int. Cl. F21v 19/00, G11b 5/00
[50] Field of Search 240/1(E)1, 2, 22, 2.1, 8.16; 116/67.2; 352/203; 274/4, 11, 1

[56] References Cited
UNITED STATES PATENTS

| | | | |
|---|---|---|---|
| 2,437,239 | 3/1948 | Boecking | 352/203X |
| 2,891,141 | 6/1959 | Lancucki et al. | 240/1(E.I.)X |
| 2,988,631 | 6/1961 | Hershey et al. | 240/2.1 |
| 3,439,919 | 4/1969 | Laa | 274/4(E) |

FOREIGN PATENTS

| | | | |
|---|---|---|---|
| 818,082 | 8/1959 | Great Britain | 240/8.16 |
| 877,343 | 9/1942 | France | 240/2 |
| 1,191,204 | 4/1959 | France | 116/67.2 |

*Primary Examiner*—John M. Horan
*Assistant Examiner*—Joseph F. Peters, Jr.
*Attorneys*—Griffin, Branigan, and Kindness, Raymond A. Andrew and William F. Pinsak

ABSTRACT: This disclosure describes an apparatus for illuminating the tape reels and the moving spindle splines of a tape cassette when the cassette is held in a tape recorder. The apparatus comprises a light bulb mounted so as to project light into a light ducting plastic glass or other transparent material. The light ducting plastic glass is mounted beneath the point where the cassette is held in the tape recorder so that light is emitted onto the reels and the moving spindle splines. In this manner, the operation of the cassette can be observed when the light is energized. The light ducting plastic glass has a diffusing surface that prevents an observer from being distracted by observing the mechanism of the tape recorder located beneath the light ducting plastic glass.

INVENTOR
Charles A. Aldridge

BY Griffin & Branigan
ATTORNEYS

INVENTOR
Charles A. Aldridge

BY Griffin & Branigan

ATTORNEYS

APPARATUS FOR ILLUMINATING THE TAPE REELS AND SPINDLE SPLINES OF TAPE CASSETTES

BACKGROUND OF THE INVENTION

This invention relates to tape recorders using cassettes. A cassette contains a takeup reel, a supply reel and a length of tape that passes between the supply reel and the takeup reel. The reels and the tape are mounted in a flat, unitary package that is usually formed of plastic. When used, the cassette is "snapped" into position in the tape recorder. After it has been placed into position, the tape recorder records audio or other information on the tape in a conventional manner. That is, upon energization of the tape recorder, the tape moves from the supply reel to the takeup reel past a recording head or heads. The information is applied to the head and the information is recorded on the tape by the head.

Many cassettes have more than one track and can be inverted in the recorder so that information can be recorded on all tracks. In addition, most cassettes have a transparent area between the reels on both sides of the cassette so that the movement of the tape and the movement of the reels can be observed regardless of whether the cassette is "up" or "down" in the tape recorder.

While tape recorders using cassettes have found widespread use, it has also been found that they have certain disadvantages. Specifically, even though a cassette has transparent areas through which the movement of the tape is observed it has been found that observation of tape movement is difficult in a well lit environment, almost impossible in a dimly lit environment and impossible in a dark environment. In addition to observing the movement of the tape and the spindle splines after the tape has started to move, it is also desirable to observe the beginning of the tape movement. Moreover, it is often desirable to observe the amount of tape left on the supply reel to determine the amount of recording time remaining to the person performing the recording. Either of these latter operations are either difficult or impossible to observe, depending on the lighting conditions, with prior art tape recorders.

The problem of observing the foregoing operations is increased in any recorder that includes a cover for covering the cassette. Obviously, if the cover is completely nontransparent the cassette cannot be observed at all. However, many covers have a transparent area so that the foregoing operations can be observed. But, because light is filtered twice (once each way) by the transparent area the difficulty of observing cassette and recorder action is greater than with a tape recorder that does not have a cover. In addition, for "looks" many of the transparent cover regions are made of "smoked" glass making the passage of light and the ultimate observance of cassette operation even more difficult. Hence, while a cover is desirable to protect the cassette, it prevents observation of cassette operation.

Attempts have been made to improve the ability to observe cassette operation; however, these attempts have been unsuccessful. For example, reflecting surfaces have been placed beneath the lower transparent window of the cassette. While this technique improves observation in a well lit environment, it does not improve observation of the operation of the cassette's elements in a poorly lit environment.

Therefore, it is an object of this invention to provide an apparatus for aiding observation of the movement of a cassette's elements when the cassette is held in a tape recorder.

It is another object of this invention to provide an apparatus that is simple and uncomplicated and suitable for aiding the observation of the movement of the tape and the spindle splines of a cassette when the cassette is held in a tape recorder.

It is a further object of this invention to provide an apparatus for aiding the observation of the movement of a cassette's elements that ducts light so that the tape and the spindle splines of a cassette can be observed when the cassette is held in a tape recorder.

SUMMARY OF THE INVENTION

In accordance with a principle of this invention an apparatus for illuminating the tape reels and the moving spindle splines of a tape cassette when the cassette is held in a tape recorder is provided. The apparatus comprises a light means mounted so as to project light into a light ducting means. The light ducting means is mounted in the recorder beneath the cassette and projects light onto the reels and the moving spindle splines of the cassette so that the operation of the elements of the cassette can be observed.

In accordance with another principle of this invention the light ducting means has a light diffusing surface that prevents an observer from being distracted by observing the mechanism of the tape recorder located beneath the light ducting means when he is observing the operation of the elements of the cassette.

In accordance with a further principle of this invention the light ducting means is a light ducting plastic, glass or other essentially solid light refracting and transmitting material. The material may either have internal reflecting surfaces or a high index of refraction or both.

It will be appreciated from the foregoing description of the invention that an uncomplicated and inexpensive apparatus for illuminating the operating elements of a tape recorder cassette is provided. The apparatus is mounted in the tape recorder beneath the cassette so that the light emitted impinges on the elements of the cassette. Due to the use of a light means or lamp, the operation of the cassette can be observed no matter whether the cassette is in a well lit environment or in a dimly lit environment. Further, the use of a diffusing surface on the light ducting means results in a system that isn't distracting to the person using it; that is, due to the diffusing surface an observer of the operation of the cassette is not distracted by also observing the operation of other elements of the tape recorder located beneath the cassette.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS OF THE INVENTION

Figure 1:
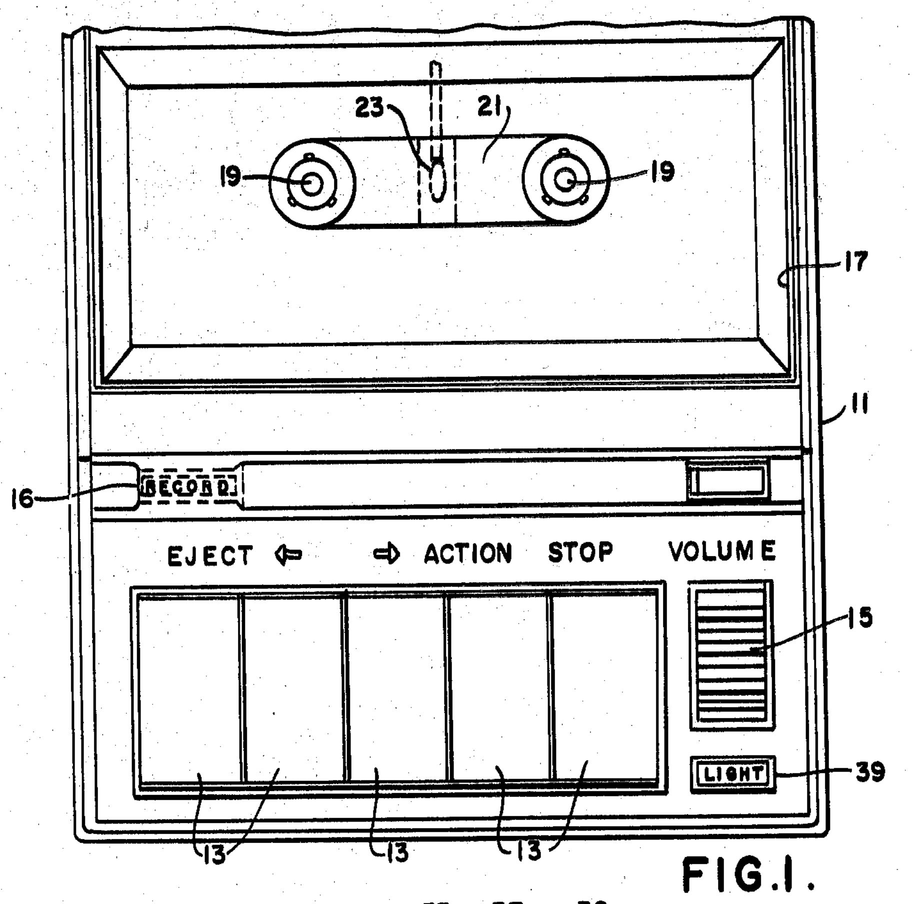
FIG. 1 is a pictorial diagram illustrating a tape recorder that uses a cassette without the cassette being mounted therein.

FIG. 1 is a partially pictorial diagram illustrating a tape recorder that uses a cassette. The recorder comprises a housing 11 having at one end a plurality of control buttons 13. The control buttons control such actions as the forward and backward movement of the tape, for example. In addition, a volume control 15 and a record control 16 are illustrated in FIG. 1.

Located adjacent to the controls, but above them in FIG. 1, is a cassette aperture 17. Located at the bottom of the aperture and projecting upwardly are a pair of spindles 19. The spindles are located so as to project through the reels of a cassette when the cassette is mounted in the cassette aperture 17. Hence, when the spindles are revolved by the tape recorder mechanism, the tape reels of the cassette also revolve.

Located between the spindles 19 is a light ducting plastic glass 21 which forms a part of the invention and is hereinafter illustrated and described with respect to FIGS. 2 and 3. Shown in dotted form in the light ducting plastic glass 21 is a lamp 23.

It will be appreciated from the foregoing description that, with the exception of the light ducting plastic glass 21 and the lamp 23, a conventional portable tape recorder that utilizes cassettes is illustrated in FIG. 1. In a conventional manner, a cassette is mounted in the cassette aperture 17 and when the recorder is operated information is either recorded on the cassette tape or information that is already on the cassette tape is played back.

Figure 2A:
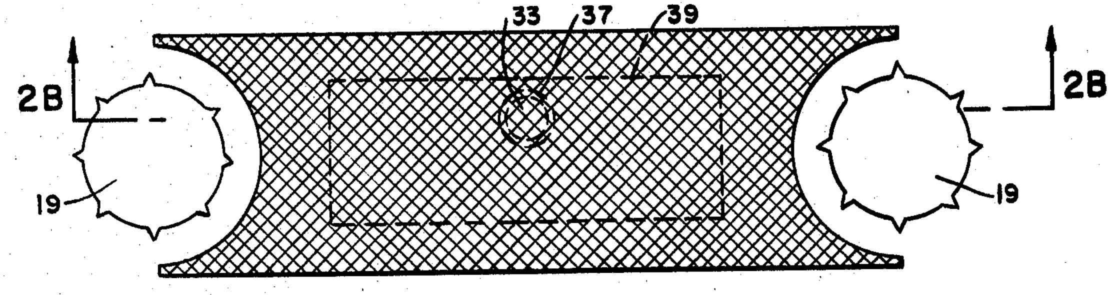
FIG. 2A is a top view of one embodiment of the invention.
Figure 2B:
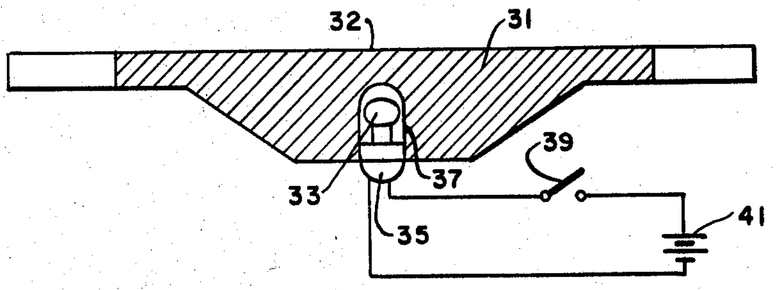
FIG. 2B is a cross-sectional view along line 2B–2B of FIG. 2A.

FIGS. 2A and B illustrate one embodiment of the invention and comprises a light ducting plastic glass or other transparent material 31, a lamp 33, and a lamp socket 35. As illustrated in FIG. 2B, the side cross-sectional view of the light ducting plastic glass parallel to its longitudinal axis is that of a flat plate having a regular trapezoid projecting downwardly from its center. The upper side of the trapezoid is longer than the lower side so that the inclined sides of the trapezoid face the upper surface of the flat plate. It should be noted that the plate and the trapezoid are actually integral, the foregoing merely being a convenient way of describing the overall configuration. As illustrated in FIG. 2B the ends of the light ducting plastic glass are semicircular in the plane of the upper surface 32. Located inside of the semicircular ends are the spindles 19 of the tape recorder.

The upper surface 32 of the light ducting plastic glass is, preferably, light diffusing. The ability of the upper surface to diffuse light can be created in a number of ways such as by frosting it or by roughening it with a diamond shaped embossing device, for example.

Located in the lower surface of the trapezoid and projecting upwardly is an aperture 37. The lamp 33 and the lamp socket 35 are mounted in the aperture 37. As illustrated in FIG. 2A the aperture is slightly above the longitudinal axis of the light ducting plastic glass (so that the most light impinges on the side at the cassette through which the tape passes).

Illustrated as a dotted rectangle 39 in FIG. 2 is the preferred location of the transparent opening in a cassette when the light ducting plastic glass and a cassette are both mounted in a tape recorder. From this location of the rectangle 39, it will be appreciated that when the invention is mounted in a tape recorder of the type illustrated in FIG. 1 and a cassette is located in the cassette aperture, the transparent window of the cassette will be adjacent to and immediately above the light ducting plastic glass 31. Hence, when the lamp 33 emits light, the light is ducted by the lighting ducting glass plastic glass to the transparent opening. Consequently, only cassette elements that can be seen through the transparent opening are illustrated. In addition, the ends of the light ducting plastic glass 31 emit light that projects onto the spindle splines of the cassette. Hence, there these elements are also illuminated.

As illustrated in FIG. 2B, the lamp 33 is preferably connected through a momentary contact switch 39 to a source of power or battery 41. The battery may be a conventional battery providing power to the tape recorder. When the switch 39 is closed, the lamp is ignited to provide the desired illumination. FIG. 1 illustrates a location for the switch 39 in the housing of the tape recorder.

The light ducting plastic glass 31 is held in the tape recorder in any of several well known ways, such as by a cement or by a spring loaded clamp means, for example.

To better reflect the light from the lamp, the lower and inclined surfaces of the trapezoid and the lower surface of the plate are coated with a reflecting material. For example, the outside of the surfaces could be silvered. Alternatively, the light ducting plastic glass could have a high index of refraction. In either case, light is reflected upwardly, through the diffusing surface, into the cassette and outwardly into the spindles.

It will be appreciated from the foregoing description of the embodiment of the invention illustrated in FIGS. 2A and 2B that a rather uncomplicated cassette illuminating apparatus is provided. Light from a lamp mounted in a light ducting plastic glass having a reflective surface or a high index of refractivity is projected through the transparent window of the cassette so that its internal operation can be observed. In addition, light is projected out of the ends of the light ducting plastic glass so that it impinges on the spindle splines of the cassette so that their operation can be observed. The level of illumination is high enough to allow the operation of the cassette to be observed under any lighting conditions. It will be appreciated that the light ducting plastic glass may be formed of glass, plastic or other essentially solid light refracting and transmitting material.

Figure 3A:
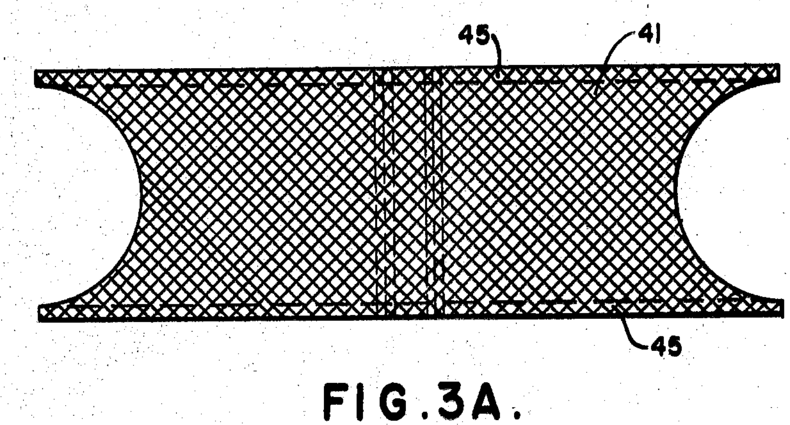
FIG. 3A is a side view of a second embodiment of the invention.
Figure 3B:
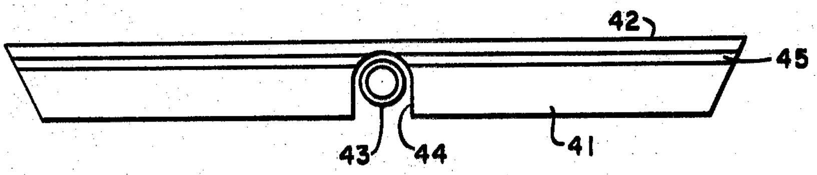
FIG. 3B is a top view of the embodiment of the invention illustrated in FIG. 3A.

FIGS. 3A and 3B illustrate an alternative embodiment of the invention. The embodiment of the invention illustrated in FIGS. 3A and 3B comprises a light ducting plastic glass 41 having an upper light diffusing surface 42. The diffusing surface of the embodiment illustrated in FIGS. 3A and 3B has the same surface configuration as the upper diffusing surface of the embodiment illustrated in FIG. 2; that is, it is generally rectangular with semicircular ends.

The side view of this embodiment of the invention is illustrated in FIG. 3B and is an inverted regular trapezoid; that is, the bottom side of the trapezoid is shorter than the top side so that the inclined sides "point" toward the upper side. Preferably, the bottom side and the lower parts of the inclined sides are coated with an internally reflecting material, such as silver, for example. Alternatively, the light ducting plastic glass could have a high index of refractivity. As illustrated in FIG. 3B an aperture 44 having an axis at right angles to the longitudinal axis of the light ducting plastic glass 41, passes through the entire length of the light ducting plastic glass. The aperture contains a lamp support tube 43 which supports a lamp in the manner illustrated in FIG. 4 and hereinafter described. In addition, a pair of slots 45 located parallel to the longitudinal axis of the light ducting plastic glass and located on opposite sides thereof are illustrated in FIG. 3. These slots aid the mounting of the light ducting plastic glass in the tape recorder so that the light ducting plastic glass is held in a desired position.

The embodiment of the invention illustrated in FIGS. 3A and 3B operates in an identical manner to the embodiment of the invention illustrated in FIGS. 2A and 2B. Specifically, light from the lamp projects into the light ducting plastic glass and is emitted through the diffusing upper surface and out the ends. The light passing through the diffusing upper surface passes through the cassette's window into the cassette. Hence, the internal operation of the cassette can be observed. The light passing out the ends of the light ducting plastic glass impinges on the spindle splines so that the operation of the spindle splines of the cassette can be observed. As with FIGS. 2A and 2B the light ducting plastic glass may be formed of plastic, glass or other essentially solid light refracting and transmitting material.

Figure 4:
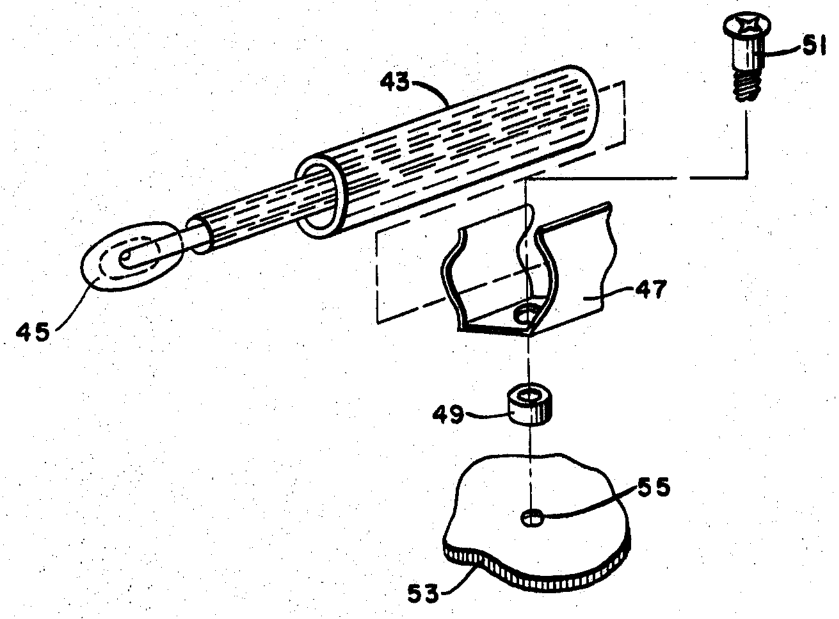
FIG. 4 is a pictorial diagram illustrating an apparatus for mounting the light in the embodiment of the invention illustrated in FIGS. 3A and B.

FIG. 4 illustrates an apparatus for mounting a lamp in the embodiment of the invention illustrated in FIGS. 3A and 3B. The apparatus illustrated in FIG. 4 comprises the support tubing 43, a lamp 45, a tube holding clip 47, a spacer 49, and a screw 51. Also illustrated in FIG. 4 is a portion of the tape recorder 53 designated the existing support plate. The existing support plate has a tapped hole 55. The spacer 49 is mounted above the hole 55 and the tubing clip is mounted above the spacer 49. The screw 51 passes through the tubing clip and the spacer, and into the hole in the support plate. The support tubing 43 is held in the clip and the lamp 45 is held in the support tubing in the desired position. This manner of mounting retains the lamp in a fixed position in the aperture 44 in the light ducting plastic glass 41 of the embodiment of the invention illustrated in FIGS. 3A and 3B.

It will be appreciated from the foregoing description of the invention that a rather uncomplicated apparatus for illuminating the operation of the elements of a cassette is provided. The apparatus is mounted in a tape recorder beneath the cassette aperture so that light is emitted through the transparent window of the cassette into the cassette. In this manner, the operation of the cassette can be observed. In addition, light is emitted onto the spindles of the tape recorder so that the spindle splines of the cassette are also illuminated. Because the upper surface of the light ducting plastic glass is a diffusing surface, the mechanism of the tape recorder located beneath the cassette cannot be observed.

It will be appreciated that the invention is uncomplicated and inexpensive. The invention merely requires a light ducting plastic glass having lower reflective surfaces or a high index of refractivity. In addition, a lamp or light means is required. The lamp is merely connected through a suitable switch means to the tape recorder's source of power.

It will be appreciated by those skilled in the art and others that various modifications may be made within the scope of the invention as hereinabove described. For example, the light ducting plastic glass may be held in the tape recorder other than by the side slots. Further, it will be appreciated that the light ducting plastic glass can have various configurations other than those specifically illustrated and described. In addition, the diffusing surface of the invention can be formed by various means and in various manners other than those herein described. Therefore, the invention can be practiced otherwise than as specifically described herein.

I claim:

1. Apparatus mountable in a tape recorder for illuminating a cassette when the cassette is held in the recorder, comprising a lamp and light ducting plastic glass means having a high index of refractivity for ducting light from said lamp toward the splines of said tape recorder, said light ducting plastic glass means having an upper surface that diffuses light and a side configuration that is a regular trapezoid having parallel upper and lower sides and having inclined sides, said inclined sides adapted to reflect light toward said upper side, said light ducting plastic glass means being mounted in said tape recorder beneath said cassette.

2. Apparatus mountable in a tape recorder for illuminating a cassette when the cassette is held in the tape recorder, comprising a lamp and light ducting plastic glass means having a high index of refractivity for ducting light from said lamp toward the splines of said tape recorder, said light ducting plastic glass means having an upper surface that diffuses light and a side configuration that is an integral plate having a centrally, downwardly projecting regular trapezoid, said trapezoid having inclined sides adapted to reflect light toward the upper surface of said plate, said light ducting plastic glass means being mounted in said tape recorder beneath said cassette.

3. Apparatus mountable in a tape recorder for illuminating a cassette when the cassette is held in the tape recorder comprising a lamp and light ducting plastic glass means having a light diffusing upper surface for ducting light from said lamp toward the splines of said tape recorder, said light ducting plastic glass means being coated with an internally reflecting material so that light from said lamp is reflected out of said light ducting plastic glass means toward said splines and having a side configuration that is a regular trapezoid having parallel upper and lower sides and having inclined sides, said inclined sides adapted to reflect light toward said upper surface, said light ducting plastic glass means being mounted in said tape recorder beneath said cassette.

4. Apparatus mountable in a tape recorder for illuminating a cassette when the cassette is held in the tape recorder comprising a lamp and light ducting plastic glass means having a light diffusing upper surface for ducting light from said lamp toward the splines of said tape recorder, said light ducting plastic glass means being coated with an internally reflecting material so that light from said lamp is reflected toward said splines and having a side configuration that is an integral plate having a centrally, downwardly projecting regular trapezoid, said trapezoid having inclined sides adapted to reflect light toward the upper surface of said plate, said light ducting plastic glass means being mounted in said tape recorder beneath said cassette.